(12) United States Patent
Dumenil et al.

(10) Patent No.: US 10,526,235 B2
(45) Date of Patent: Jan. 7, 2020

(54) PROCESS FOR MANUFACTURING GLASS SHEETS OF COMPLEX SHAPE

(71) Applicant: SAINT-GOBAIN GLASS FRANCE, Courbevoie (FR)

(72) Inventors: Thierry Dumenil, Margny les Compiegne (FR); Dominique Bureloux, Ognes (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 4 days.

(21) Appl. No.: 15/328,777

(22) PCT Filed: Jul. 23, 2015

(86) PCT No.: PCT/FR2015/052046
§ 371 (c)(1),
(2) Date: Jan. 24, 2017

(87) PCT Pub. No.: WO2016/012727
PCT Pub. Date: Jan. 28, 2016

(65) Prior Publication Data
US 2017/0217819 A1   Aug. 3, 2017

(30) Foreign Application Priority Data

Jul. 24, 2014  (FR) .................................... 14 57172

(51) Int. Cl.
*C03B 33/04* (2006.01)
*C03B 33/02* (2006.01)
(Continued)

(52) U.S. Cl.
CPC .......... *C03B 33/04* (2013.01); *C03B 33/0222* (2013.01); *C03B 33/0235* (2013.01);
(Continued)

(58) Field of Classification Search
CPC ... C03B 33/04; C03B 33/0222; C03B 33/023; C03B 33/0235; C03B 33/037
See application file for complete search history.

(56) References Cited

U.S. PATENT DOCUMENTS 1,723,200 A * 8/1929 Oberg ..................... F21V 17/02
362/317
1,860,319 A * 5/1932 Lawson .................. C03B 33/04
144/144.51
(Continued)

FOREIGN PATENT DOCUMENTS

EP   0 018 925 A1   11/1980
EP   0 587 542 A2   3/1994
(Continued)

OTHER PUBLICATIONS

Monolithic Glass Standards and Sizes, (Nov. 2013):assetmanager-ws.pilkington.com/fileserver.aspx%3Fcmd%3Dget_file%26ref%3DPerf-01-06%26cd%3Dcd+&cd=18& (Year: 2013).*
(Continued)

*Primary Examiner* — Jason L Lazorcik
(74) *Attorney, Agent, or Firm* — Pillsbury Winthrop Shaw Pittman LLP

(57) ABSTRACT

The process relates to the manufacture of a plurality of glazings of complex shape from a rectangular sheet of float glass of large dimensions. The process includes at a first station for cutting the glass sheet, scoring at least one cutting line corresponding to at least one ready-to-shape edge of the glazings; a first breaking operation; at a second cutting station, scoring at least one cutting line corresponding to at least one other ready-to-shape edge of the glazings, and a second breaking operation.

17 Claims, 3 Drawing Sheets

(51) Int. Cl.
*C03B 33/023* (2006.01)
*C03B 33/033* (2006.01)
*C03B 33/03* (2006.01)
*C03B 33/037* (2006.01)

(52) U.S. Cl.
CPC ............ *C03B 33/03* (2013.01); *C03B 33/033* (2013.01); *C03B 33/037* (2013.01)

(56) References Cited

U.S. PATENT DOCUMENTS

| | | | | |
|---|---|---|---|---|
| 2,508,017 | A * | 5/1950 | Echter | C03B 33/04 225/2 |
| 3,178,085 | A * | 4/1965 | Jochim | C03B 33/04 225/104 |
| 4,210,052 | A * | 7/1980 | Fisher | B26D 3/085 83/881 |
| 4,278,193 | A * | 7/1981 | Pereman | C03B 33/04 225/2 |
| 4,736,661 | A * | 4/1988 | Shirai | B26D 11/00 33/32.3 |
| 5,104,523 | A * | 4/1992 | Masaharu | B65G 49/064 209/585 |
| 2003/0148057 | A1 * | 8/2003 | Dietz | C03B 33/04 428/43 |
| 2005/0180036 | A1 * | 8/2005 | Maissen | C03B 33/023 359/891 |
| 2006/0207976 | A1 * | 9/2006 | Bovatsek | C03B 33/0222 219/121.69 |
| 2009/0122273 | A1 * | 5/2009 | Menard | G02B 26/008 353/84 |
| 2011/0183116 | A1 * | 7/2011 | Hung | B24B 7/241 428/156 |
| 2013/0174610 | A1 * | 7/2013 | Teranishi | C03B 33/091 65/112 |
| 2014/0094948 | A1 * | 4/2014 | Peyrude | C03B 33/037 700/106 |
| 2015/0059411 | A1 * | 3/2015 | Lim | C03B 33/0222 65/112 |
| 2016/0026948 | A1 * | 1/2016 | Ohigashi | C03B 33/037 705/7.36 |
| 2016/0152508 | A1 * | 6/2016 | Kumkar | B28D 1/221 428/43 |
| 2016/0207822 | A1 * | 7/2016 | Ohigashi | C03B 33/037 |
| 2016/0311717 | A1 * | 10/2016 | Nieber | B23K 26/0087 |
| 2017/0008122 | A1 * | 1/2017 | Wieland | B32B 17/06 |

FOREIGN PATENT DOCUMENTS

FR 1 548 431 A 12/1968
GB 1 228 637 A 4/1971

OTHER PUBLICATIONS

International Search Report as issued in International Patent Application No. PCT/FR2015/052046, dated Oct. 26, 2015.

* cited by examiner

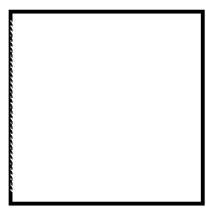 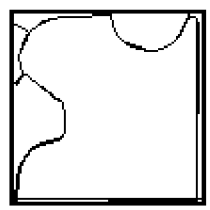 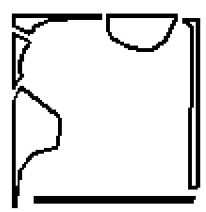 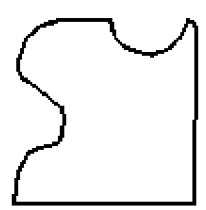
Fig.2a　　　Fig.2b　　　Fig.2c　　　Fig.2d
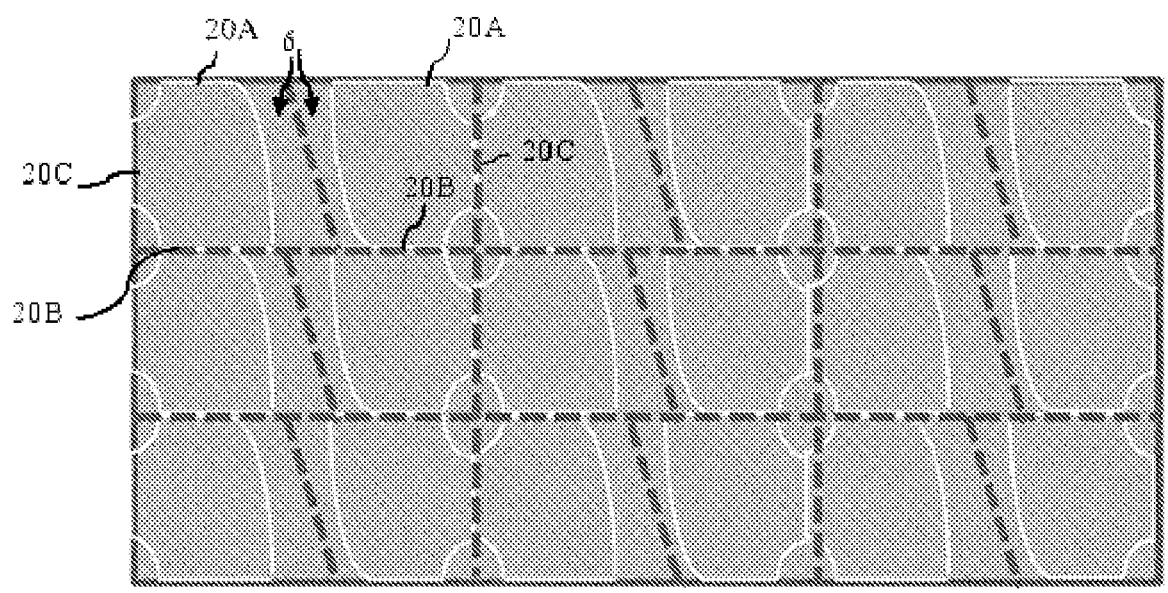
Fig.4

PROCESS FOR MANUFACTURING GLASS SHEETS OF COMPLEX SHAPE

CROSS-REFERENCE TO RELATED APPLICATIONS

This application is the U.S. National Stage of PCT/FR2015/052046, filed Jul. 23, 2015, which in turn claims priority to French patent application number 1457172 filed Jul. 24, 2014. The content of these applications are incorporated herein by reference in their entireties.

The present invention relates the field of cutting glazings of complex shape, such as for example motor vehicle glazings.

These glazings are generally cut in two goes from a "large-format" glass sheet, also referred to as a jumbo or lehr-end size glass sheet.

These are glass sheets having at least one dimension that corresponds to the width of the ribbon of float glass from which they are derived. The jumbo sizes are obtained directly by transverse cutting in the ribbon of float glass. The width of the jumbo sizes corresponds to the width of the ribbon of float glass. Their length corresponds to the length of cut ribbon. The lehr-end sizes are smaller glass sheets, the length of which corresponds itself to the width of the ribbon of float glass. The lehr-end sizes are obtained directly by cutting from the ribbon of float glass but with a length of cut ribbon smaller than the width of the ribbon of float glass, or else obtained by cutting the jumbo size transversely to its length. Thus, in practice, the jumbo sizes have minimum dimensions of at least 2.9 m by at least 4.7 m and the lehr-end sizes have dimensions of at least 2.9 m by at least 1.3 m.

In order to manufacture a glazing of complex shape, subsequent cutting steps are necessary. Generally, glass sheets of rectangular or trapezoidal shape, referred to as "blanks" are firstly cut from jumbo or lehr-end size glass sheets. These are glass sheets having a shape which is a convex polygon containing the final glazing of complex shape to be produced while leaving around the entire perimeter a "trim" sufficient for carrying out the breaking. This is what is illustrated in FIG. 1.

Next, at a second cutting station, the glazing to be shaped is formed, that is to say the "trims" are cut over the entire perimeter of the blank so that the edges of the glazing are henceforth ready to be shaped. For this, several cutting lines are for example made as illustrated in FIGS. 2a-2d for a square blank example. A shaping that consists of a grinding is then subsequently carried out.

The cutting of the blanks from the jumbo or lehr-end size glass sheets is thus carried out at a first cutting station whilst the forming of the ready-to-shape glazings is itself carried out at a second cutting station. At each cutting station, the following are carried out:
scoring of cutting lines; and
breaking along the cutting lines.

Nevertheless, this process has the drawback of generating a large offcut surface area.

One objective of the invention is to reduce the surface area of the offcuts of raw material during the cutting of glazings of complex shape from jumbo or lehr-end size glass sheets.

According to one aspect of the invention, it is a process for manufacturing a plurality of glazings of complex shape from a rectangular sheet of float glass of large dimensions having at least one dimension corresponding to the width of the ribbon of float glass from which it is produced, comprising:
at a first station for cutting said glass sheet, a step of scoring at least one cutting line corresponding to at least one ready-to-shape edge of the glazings;
a first breaking step;
at a second cutting station, a step of scoring at least one cutting line corresponding to at least one other ready-to-shape edge of the glazings;
a second breaking step.

The first cutting step generates less offcuts, in particular this step cuts down on the "trims" along the edges which are cut so as to be directly ready to be shaped. In order to do this, it will be necessary, during the first cutting step, to have sufficient accuracy in the scoring of the cutting line. Moreover, while the first step will still have the advantage of not requiring accurate focusing (i.e. referencing step of the glass), the second step will have to incorporate a step of accurate focusing before scoring.

According to particular embodiments, the process also has one or more of the following features, taken alone or in all technically possible combinations:
the accuracy of scoring the cutting lines at the first cutting station is ±0.2 mm;
the second cutting station incorporates a focusing step accurate to ±0.1 mm;
at the first cutting station, the cutting line is a straight line passing through the glass sheet from one edge to the other;
at the first cutting station, the cutting line forms a ready-to-shape edge of several glazings on the same side of the cutting line;
at the first cutting station, the cutting line also forms a ready-to-shape edge of several glazings on the other side of the cutting line;
on each side of the cutting line, the ready-to-shape edges are the same edge of the glazings;
on each side of the cutting line, the ready-to-shape edges are the opposite edges of the glazings;
the first breaking step forms a blank for each glazing to be manufactured, the second breaking step forming the ready-to-shape glazing;
the process comprises at least one additional cutting station, with at least one additional breaking step;
the process comprises, after the second breaking step, a step of shaping the glazing;
the shaping is a grinding;
two grinding steps are carried out;
the large-format glass sheet has at least one dimension of at least 2.9 m.

As is well known to a person skilled in the art, a complex shape is for example delimited by a curved line, or a succession of lines, at least some of which are not straight, or straight lines with changes in direction that form at least a concave portion (in this case, for example, the concave portion forms a notch).

BRIEF DESCRIPTION OF THE DRAWINGS

The invention will be better understood on reading the following description, given solely by way of nonlimiting example, with reference to the following figures:
FIGS. 2a-d schematically illustrate the cutting of a glazing with several cutting lines;

FIG. 4 is a diagram illustrating another example of a cutting design.

As illustrated in FIG. 3, at a first cutting station 2, all the cutting lines illustrated (as dotted lines) 4 are produced, so as to cut the blanks 6 from the jumbo size glass sheets 8 (or lehr-end size glass sheets). Here these are longitudinal edge-to-edge lines in order to form longitudinal breadths 10, transverse edge-to-edge lines in order to form transverse breadths 12, and oblique edge-to-edge lines that cut the breadths formed in two in order to obtain two blanks 6 that are symmetrical with respect to this oblique cutting line.

The cutting operation, that is to say the operation of scoring the cutting lines, is carried out at the same station, referred to as the first cutting station 2, before several breaking steps 14A, 14B, 14C are carried out successively on different tables.

The scoring of the cutting lines is for example carried out by means of a glass cutter or any other suitable cutting instrument, such as for example a laser. The cutting line is a crack intended to enable the breaking along this line during the breaking step. It is therefore a partial cut, i.e. only over a portion of the thickness of the glass sheet. This is what is understood by "cutting line" throughout the text.

Figure 1:
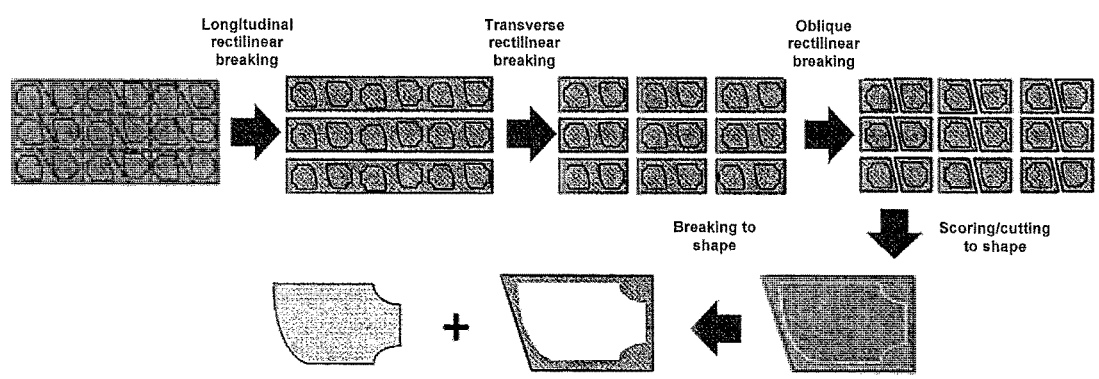
FIG. 1 schematically illustrates different cutting steps for manufacturing a glazing of complex shape.
Figure 3:
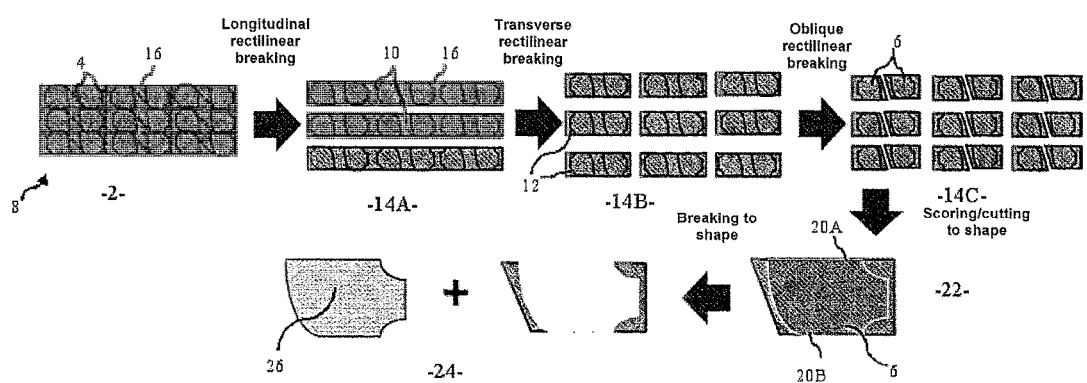
FIG. 3 is a general diagram explaining the various cutting and breaking steps according to one exemplary embodiment of the invention.

The left-hand diagram in FIG. 3 corresponds to the cutting step.

In FIG. 3, the next diagram illustrates the longitudinal rectilinear breaking 14A along the first longitudinal lines. These are longitudinal and rectilinear lines scored from one edge to the other, i.e. through-lines. These lines are parallel to the longitudinal edge 16 of the large-format glass sheet 8 and are regularly spaced out, so as to form identical longitudinal breadths 10. As a variant however, the breadths are not necessarily of the same width and generally have a width of any suitable type.

The next diagram itself shows the transverse rectilinear breaking 14B. It should be noted that longitudinal and transverse breaking may as a variant be reversed, that is to say that firstly a transverse breaking is carried out and then a longitudinal breaking. The transverse lines in the example are parallel to the transverse edge of the large-format glass sheet. These are also rectilinear through-lines. The transverse breaking also consists in producing breadths 12 that are identical, in this example. More generally, the breadths will however have a length of any suitable type.

Illustrated in the right-hand diagram is the oblique breaking step 14C for splitting the two blanks remaining in the breadths obtained. The cutting lines are rectilinear through-lines and are oblique in this example.

As a further variant, the breaking operations are combined in a different order of any suitable type.

More particularly, as is seen more clearly in the drawing of a blank in the bottom right of FIG. 3, certain cutting lines made at the first cutting station correspond to the ready-to-shape upper edge 20A and lower edge 20B of the blank 6. Indeed, the longitudinal cutting lines alternately form the lower and upper edges of the blanks located above the cutting line, and alternately form the upper and lower edges of the blanks located under the cutting line, for each longitudinal cutting line.

The blanks are provided here arranged in the same way in each longitudinal breadth 10. As a variant however, the blanks are for example arranged symmetrically with respect to the longitudinal cutting lines or according to another arrangement of any suitable type.

As a variant, it is not the lower and upper edges of the blanks that are produced in this way but other edges of the blanks. Generally, it is two ready-to-shape edges of the blanks, more generally still at least one ready-to-shape edge.

It should be noted that all the cutting lines made at the first cutting station illustrated in the example are rectilinear through-cutting lines. As a variant however, they are non-rectilinear and/or non-through-lines.

Also as a variant, it is the transverse cutting lines or the oblique cutting lines, or more generally at least one of the cutting lines made at the first cutting station, which forms a ready-to-shape edge of the glazings.

Thus, generally, the following are carried out:
at a first cutting station, a step of scoring at least one cutting line corresponding to at least one ready-to-shape edge of the glazings;
a first breaking step;
at a second cutting station 22, a step of scoring at least one cutting line corresponding to at least one other ready-to-shape edge of the glazings;
a second breaking step 24.

The first cutting step is a step of cutting a plurality of blanks 6 from said glass sheet 8 from the ribbon of float glass. As explained above, the blanks obtained after the first breaking step have at least one edge corresponding to a ready-to-shape edge of the glazing. The second cutting step 22 is a step of cutting the ready-to-shape glazing 26, also commonly referred to as a step of forming the glazing 26.

It should be noted that the implementation of the invention requires good cutting accuracy at the first cutting station 2. Thus, the scoring accuracy of the cutting lines at the first cutting station, i.e. on the large-format glass sheet, will preferably be ±0.2 mm.

Moreover, the second cutting station incorporates a focusing step accurate to ±0.1 mm. This focusing is typically carried out with an isostatic frame of reference and consists for example in bringing three points of the glazing into contact with two stops along one edge of the glazing and one stop on another edge, while the glazing is flat on a table. It may also be, for example, an optical system or a mixed contact/optical system.

FIG. 4 illustrates another example in which the transverse cutting lines have also been used to form ready-to-shape edges 20C. In FIG. 4, one of the edges of each blank obtained by transverse rectilinear cutting from the jumbo or lehr-end size glass sheet is in fact a ready-to-shape edge.

It should furthermore be noted that after cutting the ready-to-shape glazings, the latter are shaped, for example by grinding. According to one variant, there are two grinding operations.

The expression "ready-to-shape edge" is understood to mean that a cutting step is no longer necessary for this edge.

The invention claimed is:
1. A process for manufacturing a plurality of glazings of complex shape from a rectangular sheet of float glass of large dimensions having at least one dimension corresponding to a width of a ribbon of float glass from which the sheet of float glass is produced, comprising:
at a first station for cutting said glass sheet, scoring at least one cutting line corresponding to at least one ready-to-shape edge of the glazings;
a first breaking step;
at a second cutting station, scoring at least one cutting line corresponding to at least one other ready-to-shape edge of the glazings, and
a second breaking step, wherein at least one cutting line corresponding to at least one ready-to-shape edge of the glazings is a straight line passing through the glass sheet from one edge to the other; and wherein said straight line passing through the glass sheet from one edge to the other provides ready-to-shape edges on each side of the at least one cutting line and at least a portion of the ready-to-shape edges on each side of the at least one cutting line are abutting edges of at least two of the plurality glazings.

2. The process as claimed in claim 1, wherein an accuracy of scoring the cutting lines at the first cutting station is ±0.2 mm.

3. The process as claimed in claim 1, wherein the second cutting station incorporates a focusing step accurate to ±0.1 mm.

4. The process as claimed in claim 1, wherein, at the first cutting station, the cutting line forms a ready-to-shape edge of several glazings on the same side of the cutting line.

5. The process as claimed in claim 4, wherein, at the first cutting station, the cutting line also forms a ready-to-shape edge of several glazings on the other side of the cutting line.

6. The process as claimed in claim 5, wherein, on each side of the cutting line, the ready-to-shape edges are the same edge of the glazings.

7. The process as claimed in claim 5, wherein, on each side of the cutting line, the ready-to-shape edges are the opposite edges of the glazings.

8. The process as claimed in claim 1, wherein the first breaking step forms a blank for each glazing to be manufactured, the second breaking step forming the ready-to-shape glazing.

9. The process as claimed in claim 1, comprising at least one additional cutting station, with at least one additional breaking step.

10. The process as claimed claim 1, further comprising, after the second breaking step, shaping the glazing.

11. The process as claimed in claim 10, wherein the shaping is a grinding.

12. The process as claimed in claim 11, wherein two grinding steps are carried out.

13. The process as claimed in claim 1, wherein the large-format glass sheet has at least one dimension of at least 2.9 m.

14. The process as claimed in claim 1, wherein the shared edges are a same edge of each of the plurality of glazings.

15. The process as claimed in claim 1, wherein the shared edges are opposite edges of the plurality of glazings.

16. The process as claimed in claim 1, wherein the process further comprises at least one perpendicular cutting line disposed perpendicularly to the straight line passing through the glass sheet from one edge to the other.

17. The process as claimed in claim 16, wherein the at least one perpendicular cutting line provides ready-to-shape edges on each side of the at least one perpendicular cutting line and at least a portion of the ready-to-shape edges on each side of the at least one perpendicular cutting line are abutting edges of at least two of the plurality glazings.

* * * * *